United States Patent
Puel et al.

(10) Patent No.: US 12,483,190 B2
(45) Date of Patent: Nov. 25, 2025

(54) PROCESS FOR OPTIMISING THE SERVICE LIFE OF A BIFACIAL MULTIJUNCTION PHOTOVOLTAIC MODULE AND PHOTOVOLTAIC MODULE OR PANEL SUITED TO THIS PROCESS

(71) Applicants: ELECTRICITE DE FRANCE, Paris (FR); CENTRE NATIONAL DE LA RECHERCHE SCIENTIFIQUE—CNRS—, Paris (FR); ECOLE POLYTECHNIQUE, Palaiseau (FR); TOTALENERGIES ONETECH, Courbevoie (FR); INSTITUT PHOTOVOLTAIQUE D'ILE DE FRANCE (IPVF), Palaiseau (FR)

(72) Inventors: Jean-Baptiste Puel, Paris (FR); Arthur Julien, Antony (FR)

(73) Assignees: ELECTRICITE DE FRANCE, Paris (FR); CENTRE NATIONAL DE LA RECHERCHE SCIENTIFIQUE—CNRS—, Paris (FR); ECOLE POLYTECHNIQUE, Palaiseau (FR); TOTALENERGIES ONETECH, Courbevoie (FR); INSTITUT PHOTOVOLTAIQUE D'ILE DE FRANCE (IPVF), Palaiseau (FR)

( * ) Notice: Subject to any disclaimer, the term of this patent is extended or adjusted under 35 U.S.C. 154(b) by 163 days.

(21) Appl. No.: 18/577,735

(22) PCT Filed: Jul. 6, 2022

(86) PCT No.: PCT/EP2022/068801
§ 371 (c)(1),
(2) Date: Jan. 9, 2024

(87) PCT Pub. No.: WO2023/280949
PCT Pub. Date: Jan. 12, 2023

(65) Prior Publication Data
US 2024/0178792 A1 May 30, 2024

(30) Foreign Application Priority Data
Jul. 9, 2021 (FR) ..................... 2107516

(51) Int. Cl.
*H02S 50/15* (2014.01)
*H02S 40/34* (2014.01)

(52) U.S. Cl.
CPC .............. *H02S 50/15* (2014.12); *H02S 40/34* (2014.12)

(58) Field of Classification Search
CPC ................................ H02S 50/15; H02S 40/34
See application file for complete search history.

(56) References Cited

U.S. PATENT DOCUMENTS

| | | |
|---|---|---|
| 8,697,481 B2 | 4/2014 | Jones-Albertus et al. |
| 10,665,744 B2 | 5/2020 | Bitnar et al. |

(Continued)

FOREIGN PATENT DOCUMENTS

| | | |
|---|---|---|
| CN | 111262526 A | 6/2020 |
| CN | 111865217 A | 10/2020 |

(Continued)

OTHER PUBLICATIONS

International Search Report mailed on Jan. 23, 2023, in corresponding French Application No. 2107516, 5 pages.

*Primary Examiner* — Jermele M Hollington
*Assistant Examiner* — Zannatul Ferdous
(74) *Attorney, Agent, or Firm* — Maier & Maier, PLLC

(57) ABSTRACT

A lifetime optimization method for a two-sided photovoltaic module, which includes at least one multi-junction stack, where the stack's first junction layer is on the module's first side, which is exposed to the sun at the beginning of the module's life in the module's base position, and the stack's last junction layer is arranged under the module's second side, which receives diffused and reflected light and light passed through the stack. The method includes measuring the full module's output power ($P_{FM}$); calculating an estimated output power for the last junction layer ($P_{LL}$) as a function of the first irradiance in the module's turned over position, where the second side becomes its upper side; comparing the estimated $P_{LL}$ with the $P_{FM}$ when the first side is the upper side and recommending turning over the module when the base position's $P_{FM}$ becomes less than the turned over position's estimated $P_{LL}$.

18 Claims, 6 Drawing Sheets

(56) References Cited

U.S. PATENT DOCUMENTS

| | | | | |
|---|---|---|---|---|
| 2018/0331157 A1* | 11/2018 | Bedell | ................... | H10F 19/902 |
| 2019/0267931 A1* | 8/2019 | Yang | ....................... | H02S 30/10 |
| 2019/0267938 A1* | 8/2019 | Winger | ................ | H10F 19/904 |
| 2021/0126147 A1 | 4/2021 | Lee et al. | | |
| 2021/0376175 A1* | 12/2021 | Cherukupalli | .......... | H02S 40/34 |

FOREIGN PATENT DOCUMENTS

| | | |
|---|---|---|
| WO | 2018221914 A1 | 12/2018 |
| WO | 2019116031 A1 | 6/2019 |

\* cited by examiner

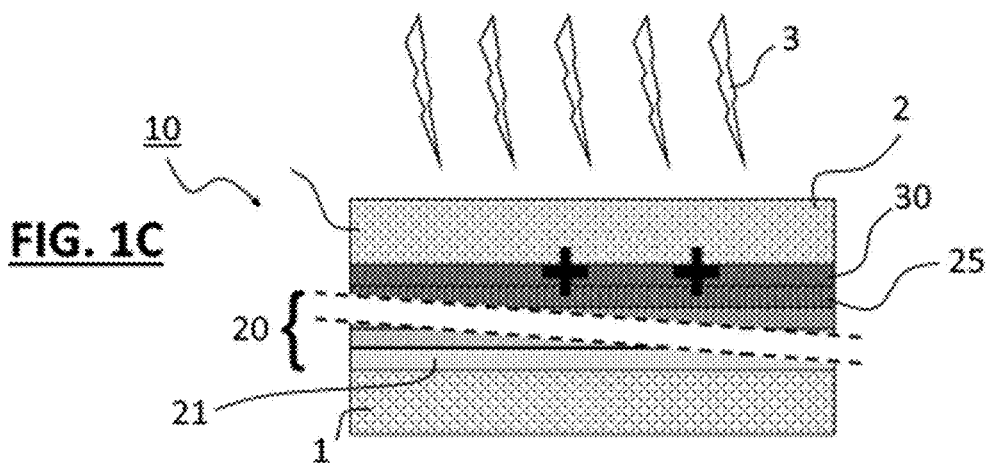
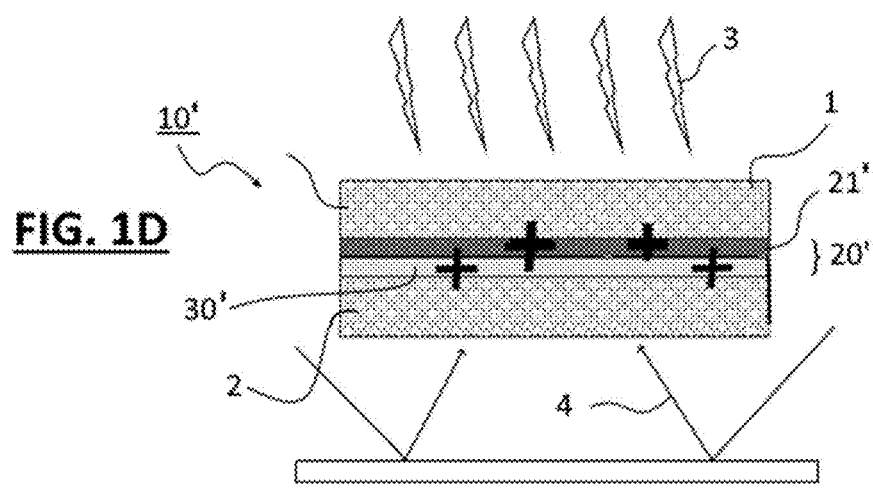

PROCESS FOR OPTIMISING THE SERVICE LIFE OF A BIFACIAL MULTIJUNCTION PHOTOVOLTAIC MODULE AND PHOTOVOLTAIC MODULE OR PANEL SUITED TO THIS PROCESS

FIELD

The present disclosure relates to a multi-junction, two-sided photovoltaic module, meaning a module comprising cells comprising a stack of junctions, for example a stack comprising a sub-cell equipped with first stacked junctions, the last of which, placed in the back, absorbs the light from the front and the back.

BACKGROUND

Today, multi-junction module technologies having reached the industrial stage are reserved for the space industry because of the high costs thereof. Multi-junction modules are not yet present on the markets for terrestrial installations (solar farms, rooftop, integrated with construction, etc.) which are currently made in one- or two-sided modules based on monocrystalline, polycrystalline or amorphous silicon cells. Many research and industrial programs are deployed for making the multi-junction technologies accessible and profitable for common use within a few years (photovoltaic farm, individuals, etc.). An important aspect for improving the profitability of these solutions is to increase their lifetime. The multi-junction cells composed of perovskite and silicon junctions are in particular studied for their good performance. However, perovskite cells today have a lifetime less than traditional silicon cells with which they may be combined in order to make multi-junction modules, and the panels using such modules do not have an optimized lifetime.

Technical Problem

In such a multi-junction module, the two junctions are connected in parallel and bound optically. The light absorbed by the lower junction is filtered by the upper junction. Consequently, when the upper junction degrades, it continues to filter the lower junction and in addition to having reduced performance it disrupts the function of this lower junction. Further, the upper junction may lose its filtering power as it degrades and becomes more and more opaque, further disrupting the lower junction.

Further, it is today possible to design cells comprising junctions having high two-sided rates: the light gathered at the rear of the junction is converted with a yield nearly as good as the light collected at the front of this junction.

SUMMARY

The present disclosure proposes a method whose purpose is to increase the lifetime of multi-junctions and of panels comprising them and giving them a second life.

More precisely, the present disclosure relates to a lifetime optimization method for a two-sided photovoltaic module comprising at least one multi-junction stack, for which a first side of the module, under which is located a first junction layer of said stack, is exposed to the sun at the beginning of life of the module in a base position of the module, referred to as first-life position, and for which a last junction layer of said multi-junction stack, of two-sided type is arranged under a second side of the module not exposed to the sun receiving diffuse and reflected light under the module and also a part of light passing through the stack, where this method comprises:

a. measuring a first irradiance $IR_{up}$ on the side of the module exposed to the sun and a second irradiance $IR_{low}$ on the side of the module not exposed to the sun, when the first side of the module is exposed to the sun;

b. measuring the output power $P_{FM}$ from the full module;

c. calculating the estimated output power $P_{E1}$ of each junction layer of the multi-junction stack taken individually when the first side is the side exposed to the sun;

d. calculating an estimated output power for said last junction layer $P_{LL}$ of the module as a function of the first irradiance in a turned over position of the module, called second-life position, where the second side of the module becomes the side exposed to the sun and the first side of the module becomes the side not exposed to the sun;

e. comparing said estimated output power of said last junction layer $P_{LL}$ with the output power of the full module $P_{FM}$ measured when the first side is the side of the module exposed to the sun;

to provide a recommendation for turning over the module when the output power of the full module $P_{FM}$ in the base position becomes less than the estimated output power of said last junction layer $P_{LL}$ in the turned over position of the module.

The method from the present disclosure serves to prolong the life of photovoltaic panels comprising photovoltaic modules with at least two stacked junctions with an upper junction or a stack of upper junctions allowing a part of the light spectrum to pass towards a two-sided type lower junction by turning them over when a degradation of the photovoltaic junctions of the upper part of the module becomes too great while the lower junction remains usable with a sufficient yield.

The characteristics presented in the following paragraphs correspond to embodiments which can be implemented independently of each other or in combination with each other:

The method may comprise, in base position, a comparison of the estimated output power from said stack of junctions $P_{stack}$ with initial output power data $P_{ini}$ from said stack of junctions with the same irradiance $IR_{ref}$ in order to determine a degradation of said stack of junctions.

This serves to improve the determination of the time when turning over is desirable.

The initial output power data are irradiance/power $IR_{ref}/P_{ini}$ pairs which can be obtained during a prior step of storing irradiance/resulting power pairs obtained for various irradiance values of said junction at the start of life of the module.

This serves to determine the yield of the module for various irradiances.

The method may stop with generating an alert for an operator but may advantageously comprise a step of turning the module over.

The method may further comprise a period of monitoring the improvement of the yield from the turned over module and a step of validation or not of said turning over as a function of the improvement or not of said yield. This may allow for example testing the turning over on a first module or panel before proceeding with turning over other panels of a solar farm in order to limit the costs of the operation.

The present disclosure further relates to a multi-junction photovoltaic module suited to the method which comprises a first stack of a first junction layer under a first side of the module and a last layer of bifacial junctions under a second side of the module, where said first layer allows a part of the light spectrum to pass towards the second layer or which comprises a second stack of a plurality of layers of junctions of decreasing bandgaps starting from said first side, for which the first layer is a first layer of the module arranged under said first side where said second stack is arranged under a final layer of bifacial junctions of the module and allowing a part of the light spectrum to pass from said first layer towards said last layer and which comprises an inhibition device at at least one of the output terminals of the layers except said last layer when the module is in turned over position with said last layer exposed to the sun.

The inhibition device is useful for avoiding disruption of the operation of the cells facing the sun after turning over by the cells having lost their efficiency and located under the panel after turning it over.

The junctions of the different layers may have different surface areas or the layers may comprise a different number of junctions for the purpose of balancing the output voltages from the layers placed in parallel.

The junctions of each of the layers may be connected in series or series/parallel networks in order to implement networks with two output terminals per layer, where said series/parallel networks are suited for balancing the voltages of each of the layers when said networks are connected in parallel and when the first layer is exposed to the sun and the last layer is not exposed to the sun.

The inhibition device may be made up of a diode inserted between an output terminal of the network from the last layer and the output terminals from the one or more other layers of the multi-junction stack. This diode is oriented so as to block the movement of the current from the last layer in position facing the sun when the other layers are located in this case under the last layer.

The inhibition device may also be made of a removable strap or a switch arranged between an output terminal of the last layer and a grouping of outputs from the other layers. The strap will be removed or the switch placed in open position when the module or the panel comprising it are turned over.

The module is preferably such that the relative aging characteristics between the layers of the module are such that the last layer is suited, by turning the module over, to deliver a nominal power greater than the whole module when the yield curve is a function of time of the whole module becomes less than the yield of the last layer in position facing the sun.

The present disclosure further relates to a photovoltaic panel comprising at least one photovoltaic module such as defined above and comprising output pads or contacts from the networks of the one or more modules both the upper surface and the lower side of the module. This simplifies the connection of the panel in both mounting directions.

The panel may comprise a frame surrounding the module, where the frame is provided with a symmetric profile provided with wings extending from both sides of the thickness of the module so as to make a low-profile frame limiting the shade cast by the frame both when the panel is in base position and when the panel is in turned over position. In this way, the wings of the frame do not create more shade when in turned over position than in initial position.

The wings of the frame may advantageously be provided with spaces for receiving a junction box suited for connection to both the output pads or contacts on the upper side of the module or to the output pads or contacts on the lower side of the module so as to limit covering of part of the side of the panel comprising the junctions by said junction box. This again limits the shading phenomena in turned over position as in base position.

The panel may advantageously comprise a pair of irradiance sensors for each side of a plane of the panel.

The pair of irradiance sensors may be located on an arm on an outer side of the panel.

The present disclosure further relates to a computer program comprising instructions for implementing the method when this program is executed by a processor.

Finally, the present disclosure relates to a nonvolatile recording medium readable by a computer on which is stored a program for implementation of the method.

BRIEF DESCRIPTION OF THE DRAWINGS

Other characteristics, details and advantages of the invention will appear to the reader of the following detailed description of nonlimiting implementation examples and on the analysis of the attached drawings on which:

FIG. 1A, FIG. 1B, and FIG. 1C show a detail of a module in section perpendicular to a plane of the module during three phases of the lifetime and according to a first embodiment;

FIG. 1D shows a detail of a module in section according to an embodiment of a module in a first position;

DETAILED DESCRIPTION

The following drawings and description contain elements which may not only serve to better understand the present invention, but also contribute to the definition thereof, as applicable.

A multi-junction photovoltaic module is a photovoltaic module comprising cells comprising either two stacked layers of junctions of different technologies, referred to as tandem cells, as described for example in the document U.S. Pat. No. 9,287,431 B1, or comprising a stack of over two layers of junctions, like technologies with multi-junction cells in III-V materials on silicon such as GaInP/AlGaAs/Si. Such a photovoltaic module is two-sided when the last junction layer is two-sided, meaning that it comprises bifacial junctions which may absorb the light filtered by the upper layers and that incident on the rear side. The multi-junction stacks comprise a stack of junctions combining several energy-absorbing materials with different bandgaps, junctions for example of pn-type made up of different stacked semiconductor materials, where the different layers are suited to produce an electric current in response to parts of the light spectrum with increasing wavelength from the first junctions layer directly exposed to the light towards a last, deep layer of junctions. The last two-sided layer then absorbs light by both surfaces thereof in response to a broad spectrum which allows the module to produce electricity by absorbing the light passing through the surface thereof exposed to the sun and passing through the stack, and by absorbing the light passing through the surface thereof not exposed to the sun which receives said diffuse light, reflected by the ground, for example.

For such a module, the one or more layers of junctions on the side exposed to direct sunlight are going to degrade more rapidly than the last junction layer on the front side not exposed to the sun. This is in particular due to the technology of the cells for which the high yield multi-junction technologies used for the surface exposed to the sun degrade more quickly than the traditional silicon technologies but also because of the exposure to the light coming directly from the sun. The present disclosure aims to take advantage of the performance of the last junction layer even when the first layers of junctions are broken down. To do that, the module is initially positioned in a base position called "first-life position," with the first layer of the tandem cell or the multi-junction layers front side exposed to the sun and the last layer, of bifacial junctions, under the module side not exposed to the sun, and then it is turned over and installed in a turned over position called "second-life position," where the layer of bifacial junctions is now the front side exposed to the sun, and where the other multi-junction layers are then preferably deactivated.

Figure 1A:
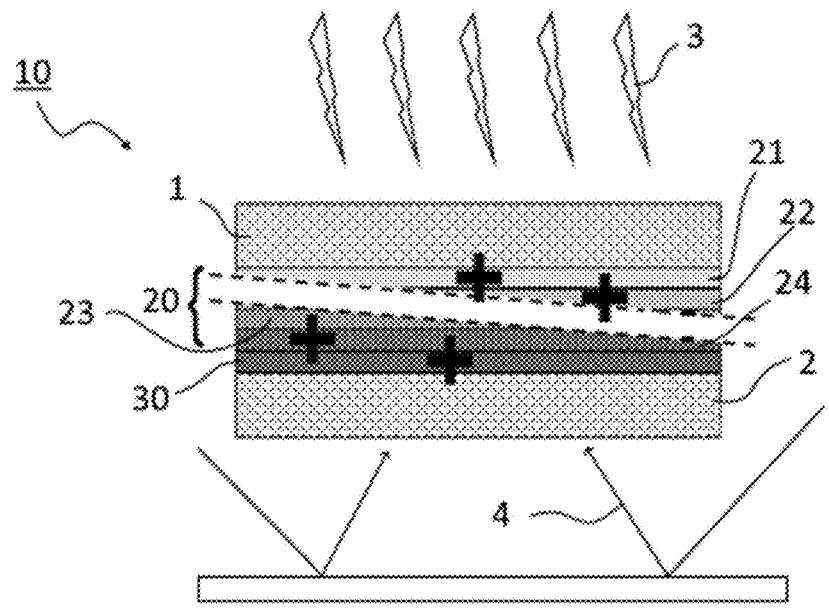
Figure 1B:
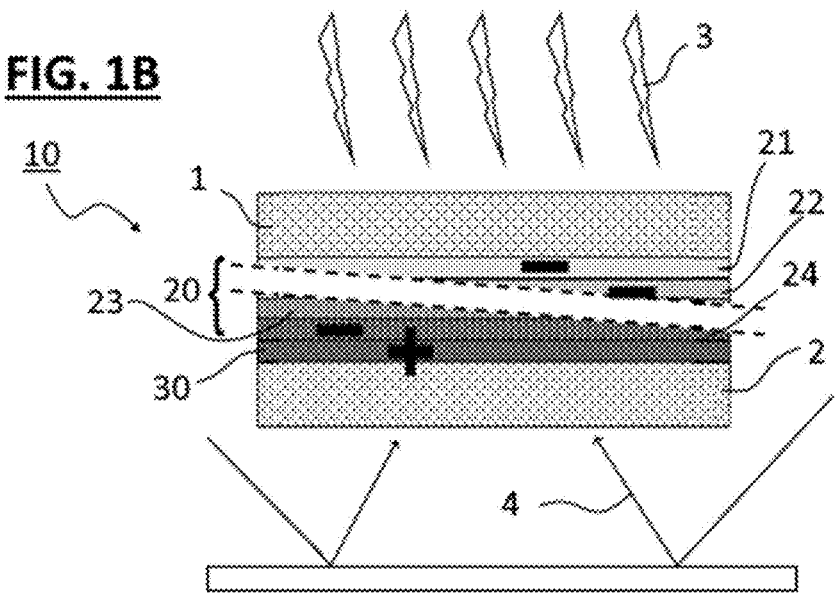

The FIGS. 1A to 1C schematically show a multi-junction module segment 10 in section perpendicular to the plane of the module.

The section of the module section, in first-life position, is shown in FIG. 1A. The module 10 comprises a first side 1 made of a transparent material which faces the sun in said first-life position. A first junction layer 21 of a multi-junction stack 20 is located under the first side. The stacking comprises junction layers 21, 22, 23, 24 of decreasing bandgaps going away from the first side, with the lower layers absorbing increasing wavelengths not absorbed by the preceding layers. The module comprises a second side 2 made with a transparent material under which a final layer of bifacial junctions 30 is located (conventionally the terminology "under which" is used even though the orientation of the drawing of the last layer is shown above the second side). The last junction layer 30 is thus positioned between the last layer 25 of the stack 20 and the second side 2 of the module.

In the beginning of life of the module, the set of junctions produces electricity represented by the + signs, the junction layers of the stack 20 with the light 3 received on the front side, and the bifacial junction layer 30 with the part of the light passing through the stack and from the light, for example diffuse and reflected 4, arriving under the module through the second side 2.

When the junctions of the stack 20 degrade as shown in FIG. 1B, the electricity produced by these layers drops as shown by the signs − whereas the layer of bifacial junctions 30 continues to produce electricity from the light received on the rear side.

This is also applicable to a module 10' provided with tandem cells according to FIG. 1D for which the multi-junction stack 20' shown in the initial position of first life then comprises only a first junction layer 21' and a second and last junction layer 30'. An interest in the method is given below in Table 1 in connection with a degradation simulation example for a tandem module or panel, meaning a module comprising on the side exposed to the sun in base position or first life a first junction layer allowing a portion of the spectrum to pass and a side not exposed to the sun a layer of bifacial junctions. This example simulates the moment at which turning the module or panel over is desirable.

In this simulated example, the degradation rate of the upper layer or junction of the stack, for example a perovskite junction layer, with 20% yield, is for example of order 1.7% per year. That of the lower layer, or subcell, of the stack, for example a silicon junction layer, with 21% yield is for example 0.5% per year, and the lower layer has a high two-sided rate. In this case, it can be estimated that the turned over module position, second-life position, could be interesting after some number of years of operation as shown by Table 1 which gives the efficiencies of the upper junction layer, the lower junction layer, of the two layers together and of the lower layer alone when the module is turned over and that layer is facing the sun.

This estimate depends on the subcells considered, the actual degradation rates observed under real conditions for the module involved, the two-sided rate and other parameters.

TABLE 1

| Year | Layer efficiency upper | Sub-layer efficiency lower | Efficiency in configuration first life | Lower layer efficiency placed in front side (second-life configuration) |
|---|---|---|---|---|
| 0 | 20.00 | 7.35 | 27.35 | 19.95 |
| 2 | 19.32 | 7.13 | 26.45 | 19.75 |
| 4 | 18.64 | 6.92 | 25.56 | 19.55 |
| 6 | 17.96 | 6.71 | 24.67 | 19.36 |
| 8 | 17.28 | 6.52 | 23.80 | 19.17 |
| 10 | 16.60 | 6.32 | 22.92 | 18.97 |
| 12 | 15.92 | 6.13 | 22.05 | 18.79 |
| 14 | 15.24 | 5.95 | 21.19 | 18.60 |
| 16 | 14.56 | 5.78 | 20.34 | 18.41 |
| 18 | 13.88 | 5.60 | 19.48 | 18.23 |
| 20 | 13.20 | 5.44 | 18.64 | 18.05 |
| 22 | 12.52 | 5.28 | 17.80 | 17.87 |
| 24 | 11.84 | 5.12 | 16.96 | 17.69 |
| 26 | 11.16 | 4.97 | 16.13 | 17.51 |
| 28 | 10.48 | 4.82 | 15.30 | 17.34 |
| 30 | 9.80 | 4.68 | 14.48 | 17.16 |

It is therefore interesting, after some operating time in first-life position configuration to take advantage of only the lower layer and of the performance thereof remaining intact for converting light on the surface exposed to the sun in second-life position configuration. In this configuration, the lower layer of the stack is then positioned on top such that it can efficiently convert all the light received from the side exposed to the sun; the contribution of the reflected light on the unexposed side is then no longer used.

In the example from the above table, the passage into turned over, second-life position is theoretically advantageous starting from year 26. However, as a function of the actual conditions of use of the modules, it is not possible, solely on the basis of a theoretical degradation rate, to predict the moment when turning over the module is desirable.

This example can be generalized to any multi-junction configuration with two-sided lower layer.

The present disclosure proposes a method with which to determine the moment when the module or panel must be turned over. The method uses the irradiance measures received on the front and rear sides of the module and calculations based on the junction technologies used; the present disclosure in particular proposes calculating the electric power supplied by the layers and the electric power the bifacial junction layer would supply base 30 if it were the front side and to determine when it is advantageous to turn over the panel, in order to get to the turned over panel configuration from FIG. 1C where the bifacial junction layer 30 is placed in front exposed to the sun and thus to optimize the lifetime of the module or panel comprising the module.

Figure 2A:
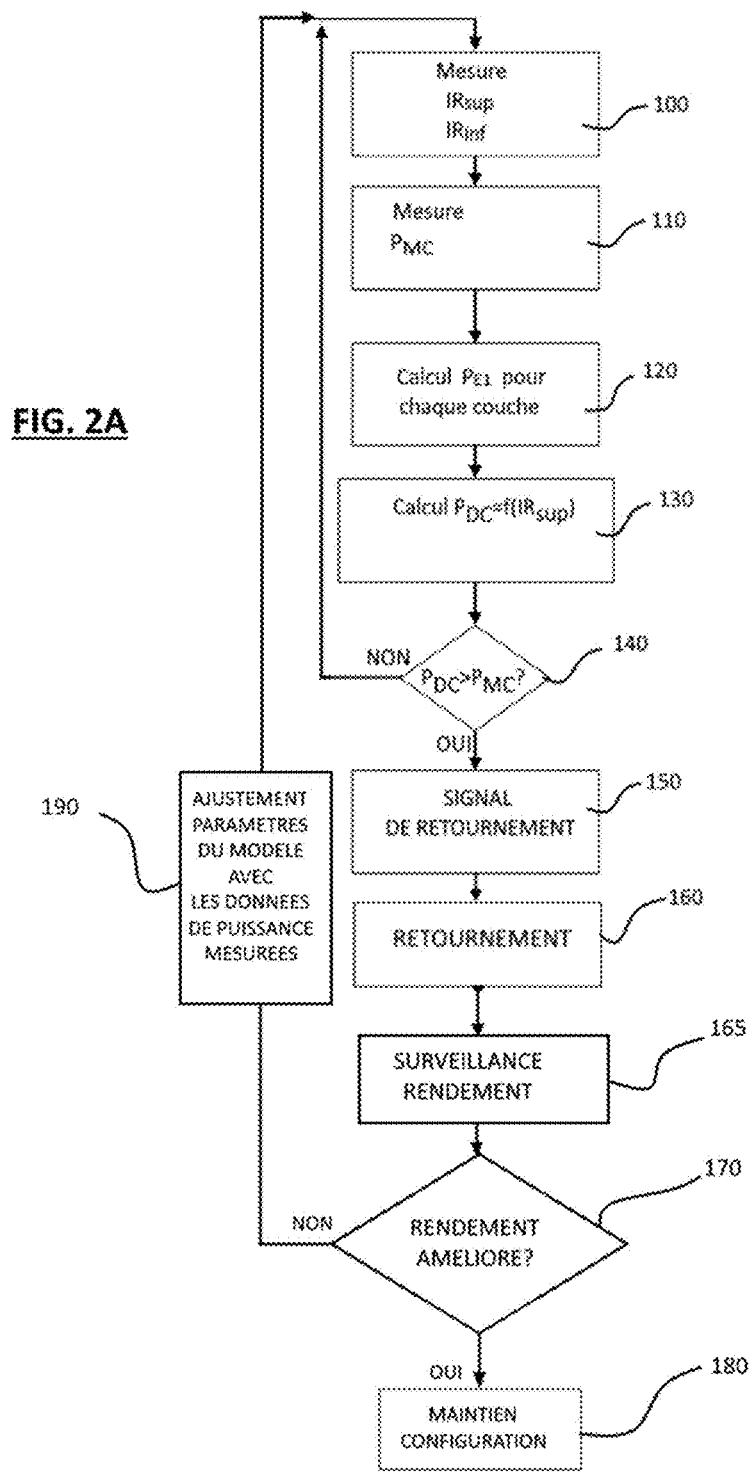
FIG. 2A shows a first sequence diagram of process steps according to the disclosure.

The method for doing this comprises the steps described in FIG. 2A and comprises in particular:
  a. measuring 100 the first irradiance $IR_{up}$ on the side of the module exposed to the sun and the second irradiance $IR_{low}$ unshaded side of the module, when the first side is the side of the module exposed to the sun in a base position called first-life position. This measurement is going to be done with irradiance sensors 50, 51 on the front side and the rear side of a panel 40 comprising the module 10 and a frame 41 as shown for example in FIG. 6.
  b. measuring 110 the output power $P_{FM}$ of the full module done by a measurement 18 of the voltage V and measuring 17 of the output current I of the panel comprising the module 10 still according to FIG. 6;
  c. calculating 120 an estimated output power $P_{E1}$ of each layer junctions from the multi-junction stack taken individually when the first side is the side of the module exposed to the sun; This calculation is going to take into account the physical characteristics of the junctions which determine the power returned from each layer as a function of the irradiance;
  d. calculating 130 an estimated output power $P_{LL}$ for said last junction layer of the module as a function of the first irradiance in a turned over position of the module, called second-life position, where the second side of the module becomes the surface exposed to the sun and the first side of the module becomes the surface not exposed to the sun. This calculation is going to consider the physical characteristics of said last layer and of the irradiance of the surface exposed to the sun;
  e. comparing 140 said estimated output power of said last junction layer with the output power of the full module measured when the first side is the side of the module exposed to the sun.

These measurements and calculations allow, step 150 to issue a recommendation for turning over the module when the output power of the full module in the base position becomes less than the estimated output power of said last junction layer in the second-life position of the module.

When the method has determined that turning over the module is favorable, a step of turning over 160 the module may be done or planned for example when the set or a part of the panels of a park will have reached a sufficient degradation.

The method for the present disclosure serves to improve the determination of when turning over the module is desirable in actual conditions of use starting from the moment when the irradiances are known on the surface exposed to the sun and the surface not exposed to the sun and the physical characteristics of the junctions making up the cells.

Figure 2B:
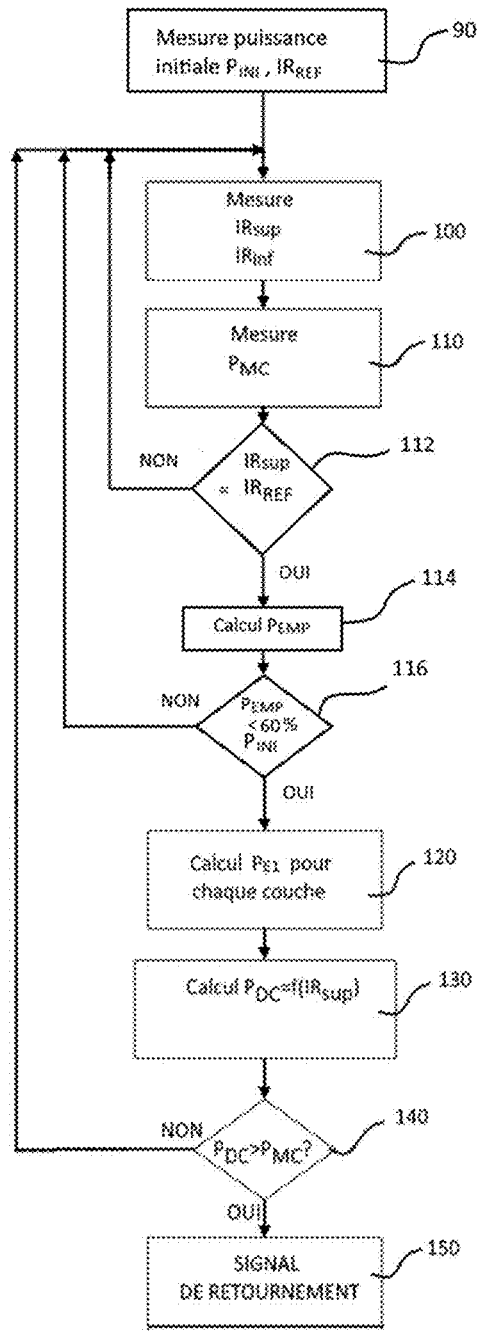
FIG. 2B shows a second sequence diagram of process steps according to the disclosure.

To improve the estimate of the deterioration of the one or more upper layers in first-life position and thus to better define when turning over is desirable, it is possible to make a comparison of the estimated output power from said stack of junctions $P_{stack}$ with initial output power data from junctions $P_{ini}$ measured in a preliminary step 90 with a reference irradiation $IR_{ref}$ in order to determine a deterioration of the first layers of junctions, for example initiating the aforementioned estimation calculations. FIG. 2B shows such a process with a step 90 of measuring and storing one or more initial powers $P_{ini}$ as a function of one or more reference irradiances $IR_{ref}$, in step 112, after the step 110 of measuring the power from the full module, a verification of consistency of the measured upper irradiation $IR_{up}$ with a reference irradiation $IR_{ref}$, in case of agreement, a step of calculating the power of the stack 114 and then a comparison of the power of the stack with a percentage of the initial power $P_{ini}$, 60% according to the example without that being limiting, in order to launch the calculations of need in turning over or not.

The initial output power data are irradiance/power pairs which can be obtained during a prior step of storing irradiance/resulting power pairs obtained for various irradiance values of said junction at the start of life of the module.

The method may next comprise a period 165 of monitoring the improvement of the yield from the turned over module and a step 170 of validating or not said turning over. Should the yield not improve, it is possible in that case to go back to the configuration in first-life position by changing the model calculation parameters for the module or panel with the measured yield or power data 190.

If the yield improved, then the turned over and second-life position configuration 180 is retained.

The module is specifically designed so that it can be either in base position or turned over and installed in second-life position configuration. To do that, various solutions have been implemented and are described in detail below.

As seen before, the module panel comprises cells formed by stacking junction layers with decreasing bandgap starting from the first side, where the junctions from this stacking allow a part of the light spectrum to pass from the upper layers towards the lower layers and where said stacking is placed on a final layer of bifacial junctions of the module.

Figure 3:
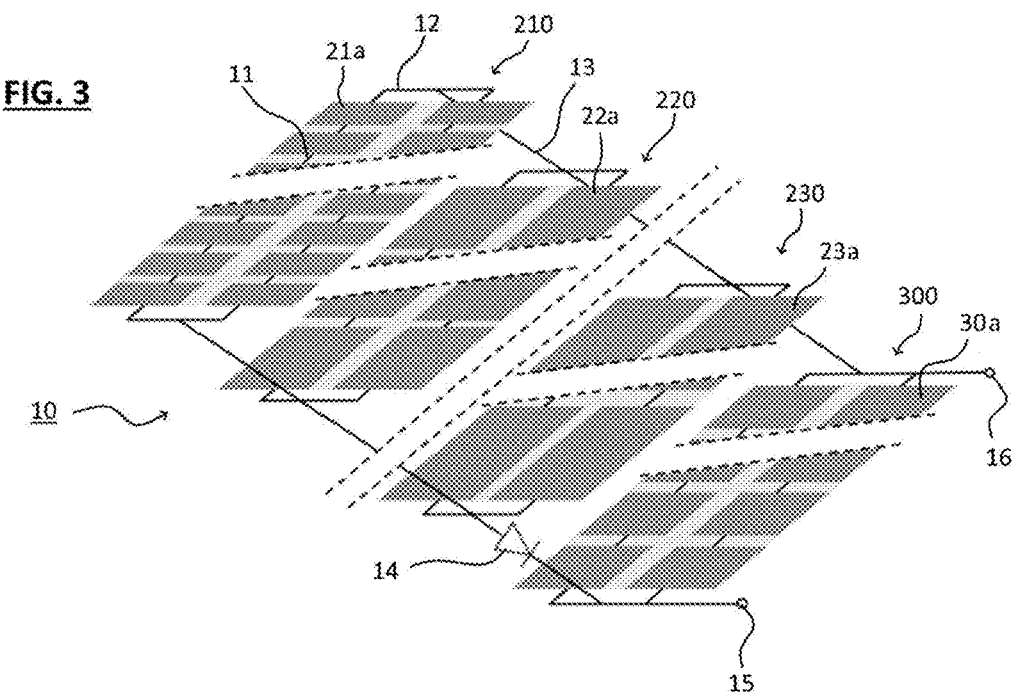
FIG. 3 shows a first example of stacking photovoltaic junction layers.

According to the example from FIG. 3, the junctions from the various layers are arranged in subcells of different surface areas in order to balance the output voltages of each of the layers so as to be able to connect them in parallel.

In this embodiment, the module comprises a stack of three layers 210, 220, 230 on a two-sided layer 300, where the junctions 21a, 22a and 23a of each layer, which could have different surface areas, are connected in series/parallel networks 11, 12 near the layers for implementing two terminal output networks by layer and in parallel 13 between layers, such that said series/parallel networks are suited to balancing voltages from each of the layers when said networks are connected in parallel and when the first layer is facing the sun and the last layer receives reflected light under the module.

As was seen above according to the present disclosure, the relative aging characteristics between the layers of the module are such that the last layer, the two-sided layer, is suited, by turning the module over, to deliver a nominal power greater than the whole module when the yield curve as a function of time of the whole module becomes less than the yield of the last layer in position facing the sun.

When the module is turned over and the one or more junctions from the multi-junction stack are no longer producing electricity, disruption of the operation of the two-sided layer needs to be avoided. To do that, according to the example, a device for inhibition of at least one of the output terminals of the layers of the multi-junction stack, with the exception of said last layer, when the module is positioned with the last layer placed facing the sun, is made up here of a diode 14.

The inhibition device may also be made up of a removable strap or a switch.

Figure 4:
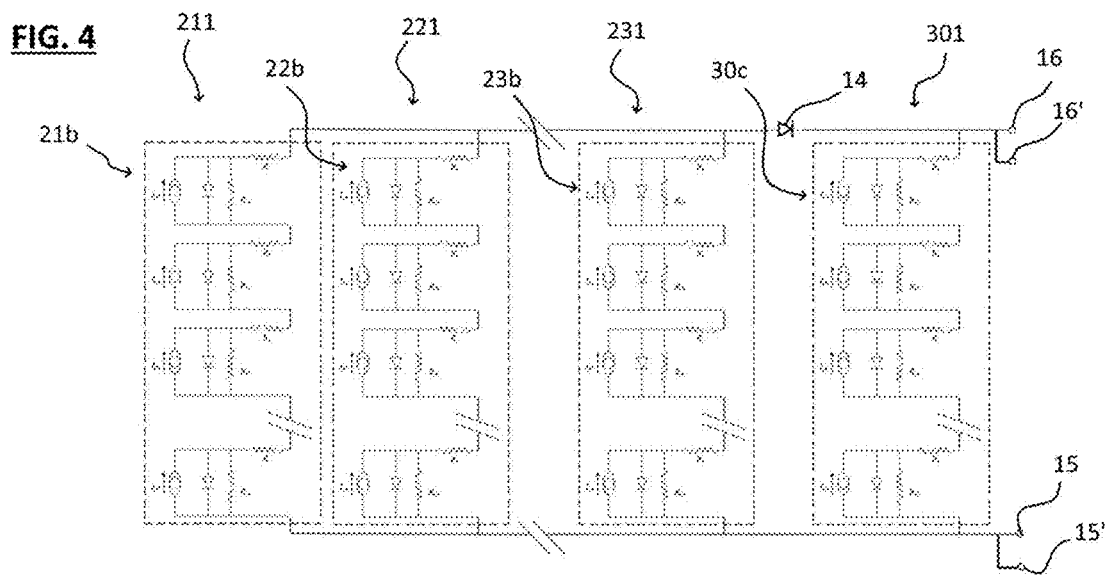
FIG. 4 shows a second example of stacking photovoltaic junction layers.

FIG. 4 shows another embodiment shown by the electrical schematic thereof for which the junctions 21b, 22b, 23c and 30c have the same number per layer and are connected in series in the layers, and where the layers 211, 221, 231 of the multi-junction stacks are connected in parallel by the connections 13, and where the diode 14 between the connections for the layers of the multi-junction stack and the layer of bifacial junctions 300 serves to inhibit inactive layers when turning over the module or panel and the connection thereof through the output terminals 15, 16.

Different configurations from those of FIGS. 3 and 4 are possible depending on junction technologies used and in particular the modules may comprise more or less than three layers of junctions stacked on the bifacial junction layer, and the arrangements of connections of the junctions stacked on the bifacial junction layer and the arrangements of connections of the junctions in the layers may differ according to the output voltages of the junctions, the materials used and the fabrication methods.

Figure 5:
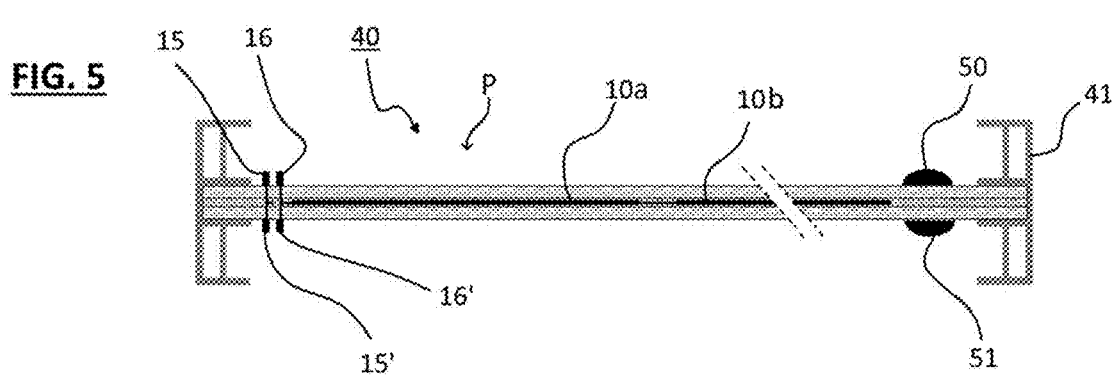
FIG. 5 shows a first implementation of the panel.

FIG. 5 represents an example of a photovoltaic panel 40 provided with one or more photovoltaic modules 10a, 10b comprising stacks of junctions according to the present disclosure in side view in section. The panel comprises a pair of irradiance sensors 50, 51 in order to measure irradiance for the method. The sensors from the pair of sensors are arranged on each side of a plane P of the panel and positioned on the part of the panel without junctions in order to limit the shading risk. These sensors are connected to calculation means such as the means 60 from FIG. 6 in order to allow the method to calculate the irradiances and implement the method.

Again for reducing the shading phenomena but also the direct radiation of the frame when the panel is turned over, the frame 41 of the panel comprises wings that are symmetrical about the plane P of the panel. Similarly, to allow connection of the panel by the lower surface, the panel comprises output pads or contacts for the networks both on the upper surface 15, 16 and on the lower surface 15', 16' of the module.

The frame is thus a low-profile frame limiting the shade cast by the frame both when the panel is in first-life position as when the panel is in second-life position.

According to FIG. 5, the wings 41a, 41b of the frame 41 are provided with spaces for receiving a junction box 42 suited for being connected both to the output pads or contacts on the upper side of the module and also to the output pads or contacts on the lower side of the module. This again limits covering a part of the side of the panel comprising the junctions with said junction box and reduces the risk of shading the panel.

The junction box connects to a control module 19 provided with current 17 and voltage 18 measurement means and calculation means: processor, program memory, working memory, and the computer program comprising instructions for implementation of the method when this program is executed by said processor, where the calculation means receive or could comprise a nonvolatile computer readable recording medium on which a program is recorded for implementing the method when this program is executed by said processor.

Figure 6:
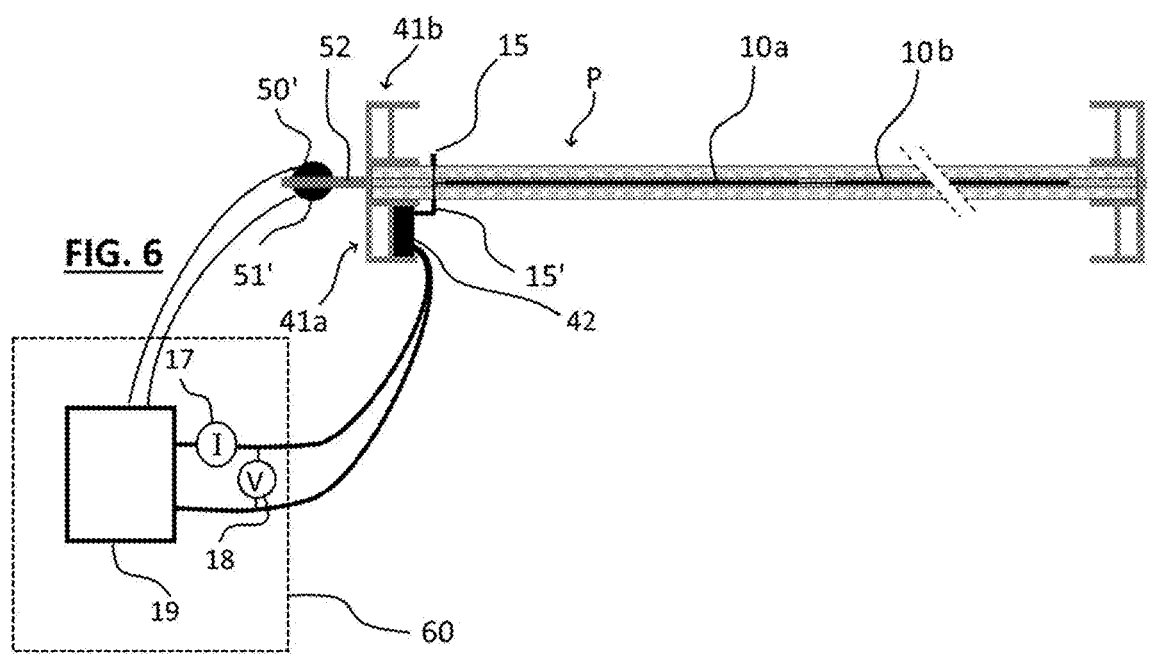
FIG. 6 shows a second implementation of the panel in connection thereof.

In the embodiment from FIG. 6, the pair of irradiance sensors 50', 51' is located on an arm 52 on an external side of the panel, where the sensors are arranged respectively on either side of the plane P of the panel. This configuration further limits the risk of shading the one or more modules of the panel in first-life and second-life configuration.

Beyond the method, the present disclosure thus proposes a photovoltaic system, panel or module, which may be used in two configurations: first-life position or second-life position, according to the performance of the module. It is designed so as to operate optimally in both configurations for extending the lifetime of the system.

The invention is not limited to the examples described above, only as examples, but it encompasses all variants which could be conceived by a person skilled in the art in the context of the protection sought and for example the panel described may be oriented on one or two axes of rotation in order to track and optimize the yield of the panel according to the irradiance received on the upper surface and lower surface.

In terms of application or markets, the method and the modules and panels of the present disclosure apply equally well to ground solar installations for example of solar farm type as well as to installations at height like photovoltaic installations on roofs, which represents an additional advantage.

The invention claimed is:

1. A method for lifetime optimization a two-sided photovoltaic module comprising at least one multi-junction stack, for which a first side of the module, under which is located a first junction layer of said stack, is exposed to the sun at the beginning of life of the module in a base position of the module, referred to as first-life position, and for which a last junction layer of said multi-junction stack, of two-sided type is arranged under a second side of the module not exposed to the sun receiving diffuse and reflected light under the module and also a part of light passing through the stack, wherein the method comprises:
    (a) measuring a first irradiance $IR_{up}$ on the side of the module exposed to the sun and a second irradiance $IR_{low}$ on the side of the module not exposed to the sun, when the first side of the module is exposed to the sun;
    (b) measuring the output power $P_{FM}$ from the full module;
    (c) calculating the estimated output power $P_{E1}$ of each junction layer of the multi-junction stack taken individually when the first side is the side exposed to the sun;
    (d) calculating an estimated output power for said last junction layer $P_{LL}$ of the module as a function of the first irradiance in a turned over position of the module, called second-life position, where the second side of the module becomes the side exposed to the sun and the first side of the module becomes the side not exposed to the sun;
    (e) comparing said estimated output power of said last junction layer $P_{LL}$ with the output power of the full module $P_{FM}$ measured when the first side is the side of the module exposed to the sun,
    to provide a recommendation for turning over the module when the output power of the full module $P_{FM}$ in the base position becomes less than the estimated output power of said last junction layer $P_{LL}$ in the turned over position of the module.

2. The method of claim 1, comprising, in base position, a comparison of the estimated output power from said stack of junctions $P_{stack}$ with initial output power data $P_{ini}$ from said stack of junctions with the same irradiance $IR_{ref}$ in order to determine a degradation of said stack of junctions.

3. The method of claim 2, wherein the initial output power data are irradiance/power $IR_{ref}/P_{ini}$ pairs which can be obtained during a prior step of storing irradiance/resulting power pairs obtained for various irradiance values of said junction at the start of life of the module.

4. The method of claim 1, comprising a step of turning over the module.

5. The method of claim 4, comprising a period of monitoring the improvement of the yield from the turned over module and a step of validation or not of said turning over as a function of the improvement or not of said yield.

6. A multi-junction photovoltaic module suited to the method of claim 1, comprising a first stack of a first junction layer under a first side of the module and a last layer of bifacial junctions under a second side of the module, where said first layer allows a part of the light spectrum to pass towards said last layer or a second stack of a plurality of layers of junctions of decreasing bandgaps starting from said first side, for which the first layer is a first layer of the module arranged under said first side where said second stack is arranged under a final layer of bifacial junctions of the module and allowing a part of the light spectrum to pass from said first layer towards said last layer and in that it comprises an inhibition device at at least one of the output terminals of said last layer or of said plurality of layers of junctions of decreasing bandgaps except said last layer when the module is in turned over position with said last layer exposed to the sun.

7. The photovoltaic module of claim 6, wherein the junctions of the different layers have different surface areas or wherein the layers comprise a different number of junctions.

8. The photovoltaic module of claim 6, wherein the junctions of each of the layer are connected in series or series/parallel networks in order to implement networks with two output terminals per layer, where said series/parallel networks are suited for balancing the voltages of each of the layers when said networks are connected in parallel and when the first layer is exposed to the sun and the last layer is not exposed to the sun.

9. The photovoltaic module of claim 6, wherein the inhibition device is made up of a diode inserted between an output terminal of the network from the last layer and the output terminals from the one or more other layers of the multi-junction stack.

10. The photovoltaic module of claim 6, wherein the inhibition device is made up of a removable strap or a switch.

11. The photovoltaic module of claim 6, wherein the relative aging characteristics between the layers of the module are such that the last layer is suited, by turning the module over, to deliver a nominal power greater than the whole module when the yield curve is a function of time of the whole module becomes less than the yield of the last layer in position facing the sun.

12. A photovoltaic panel comprising at least one photovoltaic module according to claim 6 and comprising output pads or contacts for the networks for the module(s) both on the upper surface and on the lower surface of the module.

13. A photovoltaic panel comprising at least one photovoltaic module according to claim 6 and comprising a frame surrounding the module, for which the frame is provided with a symmetric profile provided with wings extending from both sides of the thickness of the module so as to make a low-profile frame limiting the shade cast by the frame both when the panel is in base position and when the panel is in turned over position.

14. The photovoltaic panel according to claim 12, further comprising a frame surrounding the module, for which the frame is provided with a symmetric profile provided with wings extending from both sides of the thickness of the module so as to make a low-profile frame limiting the shade cast by the frame both when the panel is in base position and when the panel is in turned over position, wherein the wings of the frame are provided with spaces for receiving a junction box suited for connection to both the output pads or contacts on the upper side of the module or to the output pads or contacts on the lower side of the module so as to limit covering of part of the side of the panel comprising the junctions by said junction box.

15. The photovoltaic panel according to claim 12, comprising a pair of irradiance sensors for each side of a plane of the panel.

16. The photovoltaic panel according to claim 15, wherein the pair of irradiance sensors is located on an arm on an outer side of the panel.

17. A computer program comprising instructions for implementing the method according to claim 1 when this program is executed by a processor.

18. A nonvolatile computer readable recording medium on which the program of claim 17 is recorded.

* * * * *